(12) United States Patent
Sugimoto et al.

(10) Patent No.: US 8,455,381 B2
(45) Date of Patent: Jun. 4, 2013

(54) CERAMIC MATERIAL COMPOSITION, CERAMIC SUBSTRATE, AND NONRECIPROCAL CIRCUIT DEVICE

(75) Inventors: Yasutaka Sugimoto, Kyoto (JP); Satoshi Ohga, Yasu (JP); Takaki Murata, Kusatsu (JP)

(73) Assignee: Murata Manufacturing Co., Ltd., Nagaokakyo-Shi, Kyoto-fu (JP)

(*) Notice: Subject to any disclaimer, the term of this patent is extended or adjusted under 35 U.S.C. 154(b) by 731 days.

(21) Appl. No.: 11/583,795

(22) Filed: Oct. 20, 2006

(65) Prior Publication Data

US 2007/0036996 A1  Feb. 15, 2007

Related U.S. Application Data

(63) Continuation of application No. PCT/JP2005/016900, filed on Sep. 14, 2005.

(30) Foreign Application Priority Data

Oct. 26, 2004  (JP) .................................. 2004-310304
Nov. 25, 2004  (JP) .................................. 2004-340084

(51) Int. Cl.
C03C 1/00 (2006.01)
C03C 14/00 (2006.01)
C04B 35/00 (2006.01)
H01G 4/06 (2006.01)

(52) U.S. Cl.
USPC ........ 501/139; 501/32; 361/321.4; 361/321.5

(58) Field of Classification Search
USPC .................. 501/10, 137, 32, 139; 361/321.4, 361/321.5
See application file for complete search history.

(56) References Cited

U.S. PATENT DOCUMENTS 5,059,566 A * 10/1991 Kanai et al. ................... 501/138
5,103,370 A * 4/1992 Saito et al. ................... 361/321.4
6,108,192 A   8/2000 Sugimoto et al.
6,458,734 B1 * 10/2002 Sugimoto et al. ............. 501/139
6,703,336 B2 * 3/2004 Fukuda et al. ................ 501/139
6,797,661 B2   9/2004 Mikkenie et al.
2006/0052231 A1 * 3/2006 Ito et al. ......................... 501/77

FOREIGN PATENT DOCUMENTS

| CN | 1334569 | 2/2002 |
|---|---|---|
| CN | 1356288 | 7/2002 |
| JP | S62-017907 | 1/1987 |
| JP | H05-319921 | 12/1993 |
| JP | 06076627 A | 3/1994 |
| JP | H06-260768 | 9/1994 |
| JP | H07-162150 | 6/1995 |
| JP | H07-330427 | 12/1995 |
| JP | H08-59344 | 3/1996 |
| JP | H08-283066 | 10/1996 |
| JP | H09-092983 | 4/1997 |
| JP | 11228222 A | 8/1999 |
| JP | H11-310455 | 11/1999 |
| JP | H11-335162 | 12/1999 |
| JP | 2000-351668 | 12/2000 |
| JP | 2002-097072 | 4/2002 |
| JP | 2003-063861 | 3/2003 |
| JP | 2003-116026 * | 4/2003 |
| JP | 2003-176171 | 6/2003 |
| WO | WO-02/13214 A1 | 2/2002 |

OTHER PUBLICATIONS

International Search Report dated Nov. 1, 2005.

* cited by examiner

*Primary Examiner* — Carol M Koslow
*Assistant Examiner* — Matthew E Hoban
(74) *Attorney, Agent, or Firm* — Dickstein Shapiro LLP (57) ABSTRACT

A ceramic material composition advantageously used as a material for a ceramic substrate containing for example a resistor such as an isolator disposed therein.
includes about 10 to 45 percent by weight of a $BaO-TiO_2-ReO_{3/2}$ ceramic composition, the ceramic composition being represented by $xBaO\text{-}yTiO_2\text{-}zReO_{3/2}$ (wherein x, y, and z each represent mole percent, $8 \leq x \leq 18$, $52.5 \leq y \leq 65$, and $20 \leq z \leq 40$, and $x+y+z=100$; and Re represents a rare-earth element); about 5 to 40 percent by weight of alumina; and about 40 to 65 percent by weight of a borosilicate glass composition containing about 4 to 17.5 percent by weight of $B_2O_3$, about 28 to 50 percent by weight of $SiO_2$, 0 to about 20 percent by weight of $Al_2O_3$, and about 36 to 50 percent by weight of MO (wherein MO represents at least one compound selected from CaO, MgO, SrO and BaO), wherein the total content of the $BaO-TiO_2-ReO_{3/2}$ ceramic composition and alumina is about 35 percent by weight or more.

16 Claims, 3 Drawing Sheets

FIG. 4

CERAMIC MATERIAL COMPOSITION, CERAMIC SUBSTRATE, AND NONRECIPROCAL CIRCUIT DEVICE

This is a continuation of application Serial No. PCT/JP2005/016900, filed 14 Sep. 2005.

TECHNICAL FIELD

The present invention relates to a ceramic material composition, a ceramic substrate including the ceramic material composition, and a nonreciprocal circuit device including the ceramic substrate. In particular, the present invention relates to the improvement for increasing the dielectric constant of a sintered body obtained by sintering the ceramic material composition.

BACKGROUND ART

The present invention is associated with nonreciprocal circuit devices, such as isolators and circulators. Such nonreciprocal circuit devices are now required to have a smaller size. The ability to achieve a reduction in the size of the nonreciprocal circuit device depends on the ceramic substrate used therein. The ceramic substrate in the nonreciprocal circuit device may include a capacitor and a resistor. For example, when the device is used in a high frequency range of 800 MHz to 1.5 GHz, a capacitor is required to have a capacitance of about 100 pF. To achieve the reduction in size while maintaining the capacitance, the dielectric constant of the ceramic material constituting the ceramic substrate must be increased.

An example of a ceramic material composition that is used as a material for a ceramic substrate and that can achieve such a high dielectric constant is described in Japanese Unexamined Patent Application Publication No. 2002-97072 (Patent Document 1). Patent Document 1 proposes a ceramic material composition which can be sintered at as low as 1,000° C. or lower, can be co-fired with a metal such as Ag, and which can be used for forming a dielectric ceramic having a high dielectric constant, a high Q, and a small absolute value of the temperature coefficient of dielectric properties.

The ceramic material composition described in Patent Document 1 includes a $BaO$—$TiO_2$—$ReO_{3/2}$ ceramic composition (wherein Re represent a rare-earth element) as a filler; and a $Li_2O$-$MO$—$ZnO$—$Al_2O_3$—$B_2O_3$—$SiO_2$ glass composition (wherein M represents at least one element selected from Ba, Sr, Ca, and Mg).

The ceramic material composition described in Patent Document 1 preferably includes 65 to 85 percent by weight of the $BaO$—$TiO_2$—$ReO_{3/2}$ ceramic composition. Since the content of the $BaO$—$TiO_2$—$ReO_{3/2}$ ceramic composition is relatively high, sinterability tends to be degraded. To improve the sinterability, a low-viscosity glass needs to be used. Therefore, $Li_2O$ is incorporated in the glass composition to reduce the viscosity of the glass.

However, it has been found that when the ceramic material composition described in Patent Document 1 is used to produce a ceramic substrate included in the above-described nonreciprocal circuit device, the resistance characteristics of a resistor in the ceramic substrate disadvantageously decreases. From the results of experiments, the inventors found that the reason for the decrease in resistance characteristics was that a glass component in the ceramic material composition reacts with a resistive component in the resistor. Patent Document 1: Japanese Unexamined Patent Application Publication No. 2002-97072

DISCLOSURE OF INVENTION

Problems to be Solved by the Invention

Accordingly, it is an object of the present invention to provide a ceramic material composition that can overcome the problems described above, a ceramic substrate including the ceramic material composition, and a nonreciprocal circuit device including the ceramic substrate.

Means for Solving the Problems

A ceramic material composition according to the present invention has the following structure in order to the technical problems.

That is, a ceramic material composition according to the present invention contains a $BaO$—$TiO_2$—$ReO_{3/2}$ ceramic composition and alumina, the ceramic composition serving as a filer and being represented by $xBaO$-$yTiO_2$-$zReO_{3/2}$ (wherein x, y, and z each represent mole percent, $8 \leq x \leq 18$, $52.5 \leq y \leq 65$, and $20 \leq z \leq 40$, and $x+y+z=100$; and Re represents a rare-earth element).

The ceramic material composition includes a borosilicate glass composition containing about 4 to 17.5 percent by weight of $B_2O_3$, about 28 to 50 percent by weight of $SiO_2$, 0 to about 20 percent by weight of $Al_2O_3$, and about 36 to 50 percent by weight of MO (wherein MO represents at least one of CaO, MgO, SrO and BaO).

With respect to the contents of the components, the content of the $BaO$—$TiO_2$—$ReO_{3/2}$ ceramic composition is about 10 to 45 percent by weight. The content of alumina is about 5 to 40 percent by weight. The content of the borosilicate glass composition is about 40 to 65 percent by weight. The total content of the $BaO$—$TiO_2$—$ReO_{3/2}$ ceramic composition and alumina is about 35 percent by weight or more.

The ceramic material composition according to the present invention may further contain about 20 percent by weight or less of $CaTiO_3$. The borosilicate glass composition may further contain at least one compound selected from $Li_2O$, $Na_2O$ and $K_2O$, as long as the content of the compound is less than about 0.5 percent by weight. Furthermore, the ceramic material composition may contain about 3 parts by weight or less of $CeO_2$ with respect to 100 parts by weight of the total of the $BaO$—$TiO_2$—$ReO_{3/2}$ ceramic composition, alumina, and the borosilicate glass composition.

A ceramic substrate according to the present invention includes a ceramic layer composed of a sintered body formed by firing the ceramic material composition according to the present invention.

The ceramic substrate according to the present invention may have a multilayer structure in which a plurality of the ceramic layers are laminated. In this case, the ceramic substrate may further include a conductor mainly composed of Ag or Cu with respect to the ceramic layer. Moreover, the ceramic substrate may further contain a resistor disposed therein.

The ceramic substrate may further include a second ceramic layer having a dielectric constant of about 10 or less.

The ceramic substrate may further include a second ceramic layer composed of a sintered ceramic body containing about 26 to 65 percent by weight of a $CaO$—$Al_2O_3$—$B_2O_3$—$SiO_2$ glass composition and about 35 to 74 percent by weight of alumina.

A nonreciprocal circuit device according to the present invention may include a permanent magnet; a center electrode assembly to which a DC magnetic field is applied from the permanent magnet, the center electrode assembly including a substrate; a plurality of center electrodes disposed on the substrate, the center electrodes overlapping each other at a predetermined intersecting angle; and insulation layers disposed between the center electrodes to electrically insulate the center electrodes from each other; a case for accommodating the permanent magnet and the center electrode assembly; and a ceramic substrate on which the center electrode assembly is mounted, the ceramic substrate including a capacitor and a resistor.

In the nonreciprocal circuit device according to the present invention, the ceramic substrate is any one of the above-described ceramic substrates according to the present invention.

Advantages

A ceramic material composition according to the present invention can be sintered at a low temperature of 1,000° C. or lower; hence, the ceramic material composition can be co-fired with a metal, such as Ag or Cu, having a satisfactory conductivity. In a ceramic substrate having a multilayer structure in which a plurality of ceramic layers are laminated, the above-described metal can be used as a material for a conductor disposed in the ceramic substrate.

A sintered body obtained by firing the ceramic material composition according to the present invention has a relatively high dielectric constant. Thus, for example, with respect to an isolator, when the sintered body of the ceramic material composition according to the present invention is used as a material for constituting a ceramic substrate used in the isolator, it is possible to reduce the area of the ceramic substrate to ⅔ to ½ of that of a known ceramic substrate.

In the ceramic material composition according to the present invention, the borosilicate glass composition need not contain an alkali metal such as Li; hence, it is possible to avoid the problem of a decrease in resistance characteristics due to the reaction of the alkali metal with a resistive material constituting a resistor. Therefore, the ceramic material composition can be advantageously used as a material for forming a ceramic substrate containing a resistor, and specifically, a ceramic substrate containing a resistor included in a nonreciprocal circuit device such as an isolator.

To surely achieve the effect described above, when the borosilicate glass composition contains at least one compound selected from $Li_2O$, $Na_2O$, and $K_2O$, the content of the at least one compound is preferably less than about 0.5 percent by weight.

When the ceramic substrate according to the present invention having the ceramic layer, i.e., a first ceramic layer, composed of a sintered body of the ceramic material composition according to the present invention has a second ceramic layer having a dielectric constant of about 10 or less or has a second ceramic layer composed of a sintered ceramic body containing about 26 to 65 percent by weight of a $CaO-Al_2O_3-B_2O_3-SiO_2$ glass composition and about 35 to 74 percent by weight of alumina, the following effects are expressed.

The first ceramic layer has a high dielectric constant, and the second ceramic layer has a low dielectric constant. Therefore, when a conductor mainly for wiring is disposed with respect to the second low-dielectric-constant ceramic layer, and an element, such as a capacitor or a filter, is formed with respect to the first high-dielectric-constant ceramic layer, it is possible to reduce the size of the ceramic substrate.

When the second ceramic layer contains a $CaO-Al_2O_3-B_2O_3-SiO_2$ glass composition, a variation in characteristics and nonuniformity of characteristics due to interdiffusion in firing do not easily occur because elements in the borosilicate glass composition contained in the first ceramic layer are substantially the same as those in the glass composition contained in the second ceramic layer. Furthermore, the first ceramic layer has the same or substantially the same thermal expansion coefficient as that of the second ceramic layer; hence, structural defects, such as delamination, do not easily occur. Moreover, the second ceramic layer also does not need to contain an alkali metal. Thus, it is possible to avoid the problem of the degradation of resistance characteristics due to the reaction of the alkali metal with a resistive material constituting the resistor.

Furthermore, since the first and second ceramic layers contain glass components, it is possible to perform sintering at a relatively low temperature. When firing is performed at a temperature at which the first and second ceramic layers sinter while a constrained layer containing an inorganic material that does not sinter at a temperature at which the first and second ceramic layers sinter is disposed on at least one main surface of a green ceramic substrate, it is possible to suppress the shrinkage in the direction of the main surface by virtue of the constrained layer. As a result, it is possible to produce a ceramic substrate with high dimensional accuracy.

REFERENCE NUMERALS

| | |
|---|---|
| 1, 14, 41 | ceramic substrate |
| 2, 42 | ceramic layer |
| 3 | conductor |
| 4, 44 | outer conductive film |
| 5, 45 | inner conductive film |
| 6, 46 | via-hole conductor |
| 7, 47, C1, C2, C3 | capacitor |
| 8, R | resistor |
| 11 | lumped-constant isolator |
| 12 | permanent magnet |
| 13 | center electrode assembly |
| 15 | upper case |
| 16 | lower case |
| 28 | substrate |
| 30, 31, 32 | center electrode |
| 33 | electrical insulating layer |
| 43 | second ceramic layer |

BEST MODE FOR CARRYING OUT THE INVENTION

Figure 1:
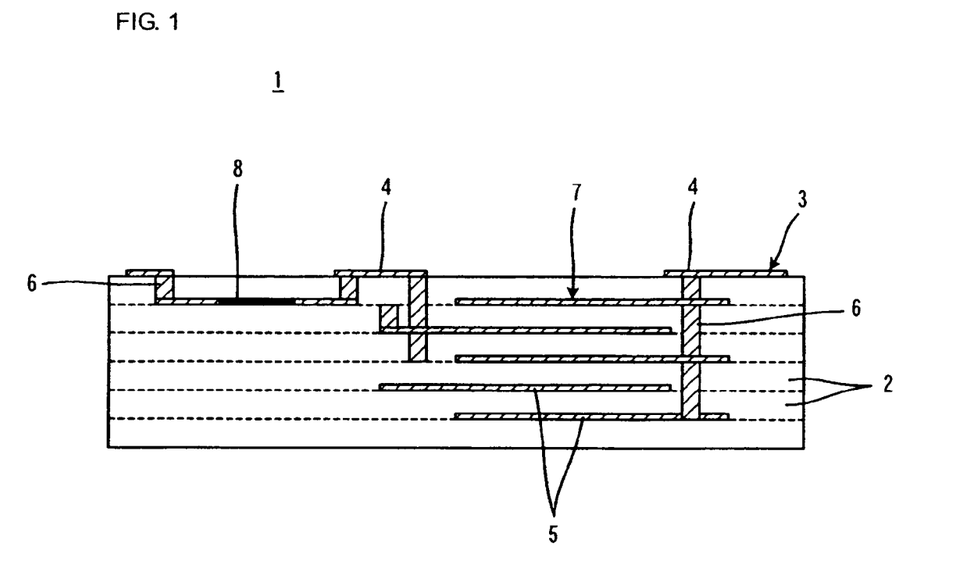
FIG. 1 is a schematic cross-sectional view of a ceramic substrate 1 according to an embodiment of the present invention.

A ceramic substrate advantageously configured by using a ceramic material composition according to the present invention will now be described. FIG. 1 is a schematic cross-sectional view of a ceramic substrate 1 according to an embodiment of the present invention.

Referring to FIG. 1, the ceramic substrate 1 has a multilayer structure in which a plurality of ceramic layers 2 are laminated. A conductor group 3 mainly composed of Ag, Cu or the like, is disposed with respect to the ceramic layers 2. The conductor group 3 includes outer conductive films 4 disposed on an external surface of the ceramic substrate 1, inner conductive films 5 each disposed along a specific interface between the ceramic layers 2, and via-hole conductors 6 each passing through a specific ceramic layer 2.

The conductor group 3 includes a conductor for forming a passive element, such as a capacitor or an inductor, inside the ceramic substrate 1 in addition to a conductor merely for an interconnection. In FIG. 1, the inner conductive films 5 and the via-hole conductor 6 shown in the right hand portion of the ceramic substrate 1 constitute a capacitor 7. First ceramic layers formed of sintered bodies of the ceramic material composition according to the present invention may be used as the ceramic layers 2 between the inner conductive films 5 constituting the capacitor 7, and second ceramic layers formed of sintered bodies of a material composition having a relatively low dielectric constant may be used as the ceramic layers 2 not constituting the capacitor 7.

The ceramic substrate 1 contains a resistor 8 disposed therein. The resistor 8 can be formed of a resistive film disposed along a specific interface between the ceramic layers 2. The resistive film is mainly composed of, for example, $RuO_2$ and formed by sintering a resistor paste containing a silicate glass as an inorganic component.

Figure 2:
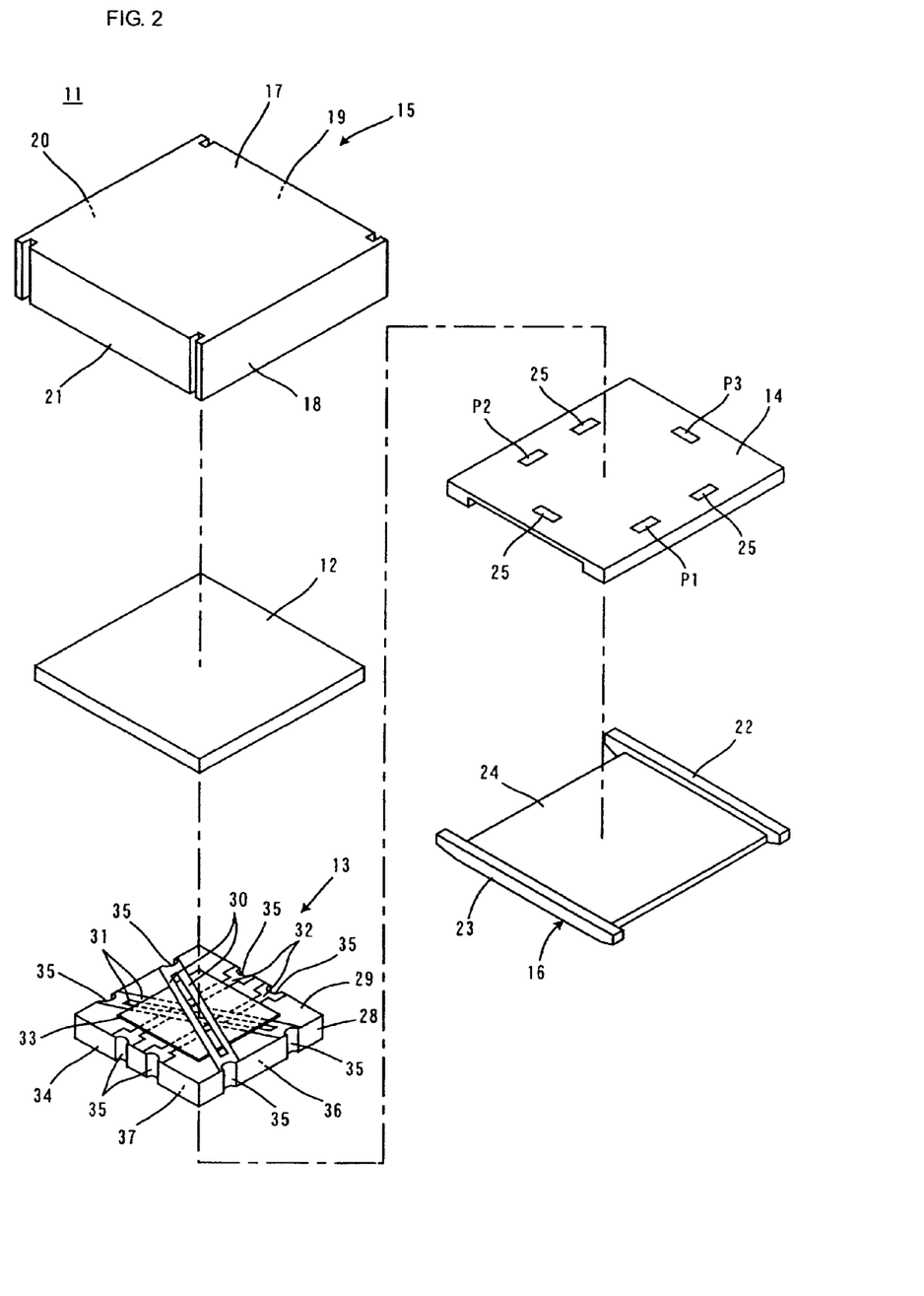
FIG. 2 is an exploded perspective view of a lumped-constant isolator 11 as an example of a nonreciprocal circuit device according to another embodiment of the present invention.

Next, a nonreciprocal circuit device including the ceramic substrate advantageously configured by using a ceramic material composition according to the present invention will now be described. FIG. 2 is an exploded perspective view of a lumped-constant isolator 11 as an example of a nonreciprocal circuit device.

Referring to FIG. 2, the lumped-constant isolator 11 includes a rectangular, flat permanent magnet 12, a center electrode assembly 13, a mounting ceramic substrate 14, an upper case 15, and a lower case 16, the upper case 15 and the lower case 16 being composed of a metal.

The upper case 15 has a box shape, an opening facing downward, a top 17, and four side walls 18 to 21. The lower case 16 includes two riser walls 22 and 23 that are opposite each other and a bottom 24 for connecting between the riser walls 22 and 23. Preferably, the upper case 15 and the lower case 16 are each composed of a ferromagnetic material and each have a surface plated with Ag or Cu.

Figure 3:
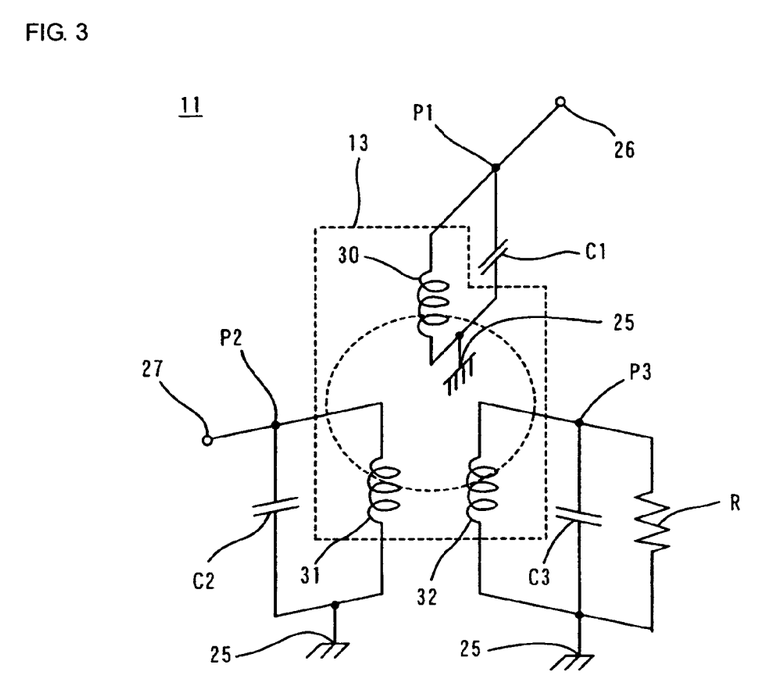
FIG. 3 is an equivalent-circuit diagram of the lumped-constant isolator 11 shown in FIG. 2.

FIG. 3 is an equivalent-circuit diagram of the lumped-constant isolator 11 shown in FIG. 2. Referring to FIG. 3 in addition to FIG. 2, the center electrode assembly 13 and the supporting layer 14 will be described in detail below.

The mechanical structure of the ceramic substrate 14 is not shown in the figure. The ceramic substrate 14 has a multilayer structure in which a plurality of ceramic layers are laminated. As shown in FIG. 3, the ceramic substrate 14 contains matching capacitors C1, C2, and C3 and a resistor R disposed therein. The structures of the matching capacitors C1, C2, and C3 and the resistor R are substantially identical to those of the capacitor 7 and the resistor 8 in the ceramic substrate 1 shown in FIG. 1.

Port electrodes P1, P2, and P3 and grounding electrodes 25 are exposed at the upper surface of the ceramic substrate 14. Although not shown in FIG. 2 but shown in FIG. 3, an input electrode 26 and an output electrode 27 are disposed at the lower surface of the ceramic substrate 14.

The center electrode assembly 13 includes a rectangular, flat substrate 28 composed of a microwave-use ferrite. Three center electrodes 30, 31, and 32 are disposed on the upper surface of the substrate 28. These center electrodes 30 to 32 are insulated from each other by interposing electrical insulating layers 33 between the center electrodes. Furthermore, the three center electrodes 30, 31, and 32 are disposed so as to intersect with each other at an angle of about 120°.

The center electrodes 30 to 32 may be arranged in any order. In the embodiment shown in FIG. 2, the center electrode 32, an electrical insulating layer 33, the center electrode 31, an electrical insulating layer 33, and the center electrode 30 are disposed in that order from the bottom.

One end of each of the center electrodes 30 to 32' is connected to a grounding electrode 37 disposed on the lower surface 36 of the substrate 10 via a connecting electrode 35 disposed on the side surface 34 of the substrate 28. The other end is connected to the corresponding port electrodes P1 to P3 on the ceramic substrate 14 via the connecting electrode 35 disposed on the side surface 34.

In this way, the grounding sides of the center electrodes 30 to 32 are connected to the common grounding electrode 37 via the connecting electrodes 35. The common grounding electrode 37 has substantially the same shape as that of the lower surface 36 of the substrate 28 and covers substantially the entire surface of the lower surface 36 so as to avoid contacting with the port electrodes P1 to P3 disposed on the ceramic substrate 14. The grounding electrode 37 is connected to the grounding electrodes 25 on the ceramic substrate 14.

When assembling the lumped-constant isolator 11 from those components, the ceramic substrate 14 is incorporated in the lower case 16. The center electrode assembly 13 is placed thereon, and then predetermined electrical connections are established. On the other hand, the permanent magnet 12 is disposed on the lower side of the top 17 of the upper case 15. The upper case 15 and the lower case 16 are joined while this state is maintained, thereby resulting in a unitary metal case.

When the lumped-constant isolator 11 is assembled described above, the permanent magnet 12 applies a DC magnetic field to the center electrode assembly 13. In this case, the metal case formed of the upper case 15 and the lower case 16 forms a magnetic circuit and also functions as a yoke.

In the above-described ceramic substrate 1 shown in FIG. 1 and the ceramic substrate 14 included in the lumped-constant isolator 11 illustrated in FIGS. 2 and 3, the ceramic material composition according to the present invention is advantageously used to form the ceramic layer.

As described above, the ceramic material composition according to the present invention contains the $BaO$—$TiO_2$—$ReO_{3/2}$ ceramic composition and alumina and further contains the borosilicate glass composition containing less than about 0.5 percent by weight of an alkali metal oxide, such as LiO. A sintered body of such a ceramic material composition has a relatively high dielectric constant. Furthermore, when a ceramic substrate containing a resistor is formed, there is no degradation of resistance characteristics of the resistor.

Specifically, the $BaO$—$TiO_2$—$ReO_{3/2}$ ceramic composition is represented by $xBaO$-$yTiO_2$-$zReO_{3/2}$ (wherein x, y, and z each represent mole percent, $8 \leq x \leq 18$, $52.5 \leq y \leq 65$, and $20 \leq z \leq 40$, and $x+y+z=100$; and Re represents a rare-earth element).

The borosilicate glass composition contains about 4 to 17.5 percent by weight of $B_2O_3$, about 28 to 50 percent by weight of $SiO_2$, 0 to about 20 percent by weight of $Al_2O_3$, and about 36 to 50 percent by weight of MO (wherein MO represents at least one of CaO, MgO, SrO and BaO).

Furthermore, the ceramic material composition includes about 10 to 45 percent by weight of a $BaO$—$TiO_2$—$ReO_{3/2}$ ceramic composition, about 5 to 40 percent by weight of alumina, and about 40 to 65 percent by weight of a borosilicate glass composition, wherein the total content of the BaO—TiO$_2$—ReO$_{3/2}$ ceramic composition and alumina is about 35 percent by weight or more.

The ceramic material composition according to the present invention may further contain about 20 percent by weight or less of CaTiO$_3$. The borosilicate glass composition may further contain at least one compound selected from Li$_2$O, Na$_2$O and K$_2$O, as long as the content of the compound is less than about 0.5 percent by weight. Furthermore, the ceramic material composition may contain about 3 parts by weight or less of CeO$_2$ with respect to 100 parts by weight of the total of the BaO—TiO$_2$—ReO$_{3/2}$ ceramic composition, alumina and the borosilicate glass composition.

When the ceramic material composition according to the present invention contains about 1 percent by weight or less of at least one compound of TiO$_2$ and ZrO$_2$, the absolute value of the temperature coefficient of the dielectric constant of a sintered body obtained by firing the ceramic material composition can be reduced.

Figure 4:
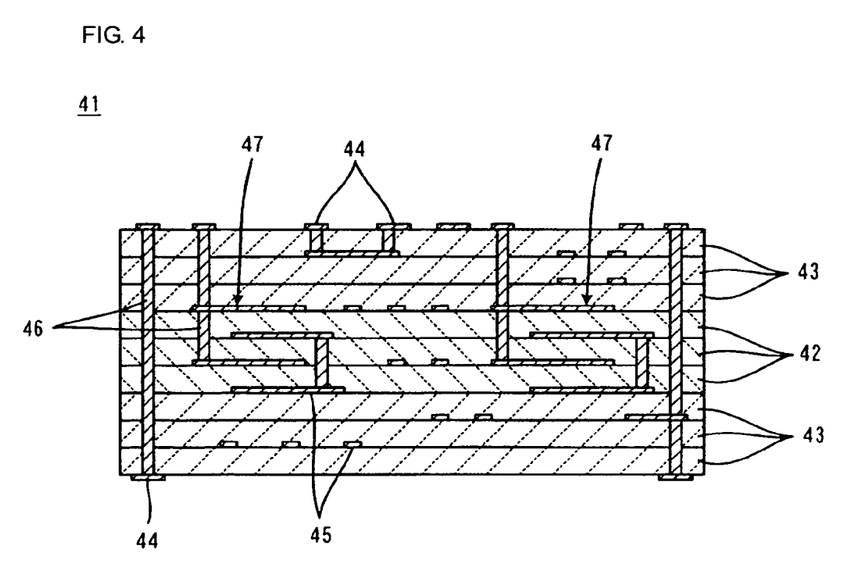
FIG. 4 is a schematic cross-sectional view of a ceramic substrate 41 according to another embodiment of the present invention.

The ceramic material composition can be used for a ceramic substrate 41 shown in FIG. 4. FIG. 4 is a schematic cross-sectional view of a ceramic substrate 41 according to another embodiment of the present invention.

The ceramic substrate 41 shown in FIG. 4 has a composite structure including a high-dielectric-constant layer and a low-dielectric-constant layer. In more detail, the ceramic substrate 41 has a composite laminated structure including a plurality of laminated first ceramic layers 42 and a plurality of laminated second ceramic layers 43. In this embodiment, the plurality of first ceramic layers 42 are disposed between the second ceramic layers 43, specific layers among the first ceramic layers 42 being in contact with specific layers among the second ceramic layers 43.

The first ceramic layers 42 are each formed of a sintered body of the ceramic material composition according to the present invention and each have a relatively high dielectric constant, for example, a dielectric constant of more than 10. On the other hand, the second ceramic layers 43 are each formed of a sintered body of a ceramic material containing about 26 to 65 percent by weight of a CaO—Al$_2$O$_3$—B$_2$O$_3$—SiO$_2$ glass composition and about 35 to 74 percent by weight of alumina and has a relatively low dielectric constant, for example, a dielectric constant of 10 or less.

The ceramic substrate 41 includes various conductors with respect to the ceramic layers 42 and 43. Each conductor is mainly composed of Ag, Cu or the like. The conductors typically include outer conductive films 44 disposed on an external surface of the ceramic substrate 41, inner conductive films 45 each disposed along specific interfaces between the ceramic layers 42 and 43, and via-hole conductors 46 passing through specific ceramic layers 42 and 43.

Some of the inner conductive films 45 and the via-hole conductors 46 disposed with respect to the first ceramic layers 42 are arranged so as to provide capacitance, thereby forming a capacitor 47.

When the inner conductive films 45 and the via-hole conductors 46 that are disposed with respect to the second ceramic layers 43 are mainly used for wiring, the delay of an electrical signal and cross talk between lines can be reduced because of a relatively low dielectric constant of the second ceramic layers 43.

Therefore, the composite structure of the ceramic substrate 41 as shown in FIG. 4 can reduce the size thereof. The elements contained in the glass component in the first ceramic layers 42 are substantially the same as those contained in the glass component in the second ceramic layers 43. Thus, as will be apparent from experimental examples described below, variation in characteristics and the nonuniformity of characteristics due to interdiffusion do not easily occur. Furthermore, each first ceramic layer 42 has the same or substantially the same thermal expansion coefficient as that of each second ceramic layer 43; hence, a structural defect, such as delamination, does not easily occur, as will be apparent from the experimental examples described below.

In FIG. 4, a resistor is not shown but the ceramic substrate 41 may contain a resistor. In this case, the first ceramic layers 42 and the second ceramic layers 43 do not need to contain an alkali metal; hence, it is possible to avoid the problem of the degradation of resistance characteristics due to the reaction of the alkali metal with a resistive material constituting the resistor.

The ceramic materials constituting the ceramic layers 42 and 43 can be sintered at a relatively low temperature of, for example, 1,000° C. or lower. In producing the ceramic substrate 41, a constrained layer containing an inorganic material that does not sinter at this temperature can be disposed on at least one main surface of a green ceramic substrate 41, and then firing is performed at a temperature at which the ceramic materials contained in the first and second ceramic layers 42 and 43 are sintered. As a result, the shrinkage in the directions of the main surfaces of the first and second ceramic layers 42 and 43 is suppressed to achieve high dimensional accuracy in the ceramic substrate 41. Furthermore, warpage in the ceramic substrate 41 does not easily occur.

Some of the chip components constituting a semiconductor device, a multilayer capacitor, an inductor, or the like (not shown) are mounted on the upper surface of the ceramic substrate 41 shown in FIG. 4 while the chip components are electrically connected to specific outer conductive films 44. Furthermore, in some cases, a metal case is attached on the upper surface of the ceramic substrate 41 so as to cover the chip components. The ceramic substrate 41 is mounted on a motherboard (not shown) by using specific outer conductive films 44 disposed on the lower surface as connecting terminals.

Experimental examples that serve as the basis for determining the composition range of the ceramic material composition according to the present invention will be described below.

EXPERIMENTAL EXAMPLE 1

1. Production of Ceramic Composition

To produce a BaO—TiO$_2$—ReO$_{3/2}$ ceramic composition, powders of BaCO$_3$, TiO$_2$, Nd$_2$O$_3$, Pr$_2$O$_3$ and Sm$_2$O$_3$ were weighed so as to achieve contents of BaCO$_3$, TiO$_2$, ReO$_{3/2}$ and the like shown in Table 1, and then the weighed powders were mixed. The resulting material powder mixture was calcined at 1,150° C. for 1 hour. Then, the resulting calcine was pulverized.

In this way, ceramic compositions S1 to S10 shown in Table 1 were obtained.

TABLE 1

| Type of ceramic | BaO | TiO$_2$ | ReO$_{3/2}$ |
|---|---|---|---|
| S1 | 13 | 58 | Nd: 10, Sm: 19 |
| S2 | 25 | 55 | Nd: 20 |
| S3 | 5 | 75 | Nd: 20 |
| S4 | 2 | 65 | Nd: 33 |
| S5 | 10 | 50 | Nd: 40 |
| S6 | 18 | 62 | Nd: 20 |

TABLE 1-continued

| Type of ceramic | BaO | TiO₂ | ReO$_{3/2}$ |
|---|---|---|---|
| S7 | 8 | 65 | Nd: 27 |
| S8 | 8 | 52.5 | Nd: 39.5 |
| S9 | 13 | 58 | Sm: 29 |
| S10 | 13 | 58 | Pr: 6, Sm: 23 |

(unit: mol %)

2. Production of Glass Composition

To produce a borosilicate glass composition, powders of CaO, MgO, SrO, BaO, $Al_2O_3$, $B_2O_3$, $SiO_2$, $Li_2O$, $Na_2O$, $K_2O$ and PbO were weighed so as to achieve contents shown in Table 2, and then the weighed powders were sufficiently mixed. The resulting material powder mixture melted at 1,100° C. to 1,400° C. and then poured into water to be rapidly cooled, followed by wet-milling.

In this way, glass composition G1 to G27 were obtained.

TABLE 2

| Type of glass | CaO | MgO | SrO | BaO | Al₂O₃ | B₂O₃ | SiO₂ | Other |
|---|---|---|---|---|---|---|---|---|
| G1 | 45 | — | — | — | 5 | 5 | 45 | — |
| G2 | 30 | — | — | — | 5 | 5 | 60 | — |
| G3 | 36 | — | — | — | 7 | 7 | 50 | — |
| G4 | 50 | — | — | — | 5 | 5 | 40 | — |
| G5 | 60 | — | — | — | 5 | 5 | 30 | — |
| G6 | 45 | — | — | — | 0 | 5 | 50 | — |
| G7 | 45 | — | — | — | 20 | 5 | 30 | — |
| G8 | 35 | — | — | — | 30 | 5 | 30 | — |
| G9 | 45 | — | — | — | 5 | 2 | 48 | — |
| G10 | 45 | — | — | — | 5 | 4 | 46 | — |
| G11 | 45 | — | — | — | 5 | 17.5 | 32.5 | — |
| G12 | 45 | — | — | — | 5 | 20 | 30 | — |
| G13 | 45 | — | — | — | 15 | 15 | 25 | — |
| G14 | 45 | — | — | — | 15 | 12 | 28 | — |
| G15 | — | 45 | — | — | 5 | 5 | 45 | — |
| G16 | — | — | 45 | — | 5 | 5 | 45 | — |
| G17 | — | — | — | 45 | 5 | 5 | 45 | — |
| G18 | 44.7 | — | — | — | 5 | 5 | 45 | Li₂O: 0.3 |
| G19 | 44.5 | — | — | — | 5 | 5 | 45 | Li₂O: 0.5 |
| G20 | 45 | — | — | — | 5 | 5 | 45 | Li₂O: 1 |
| G21 | 44.7 | — | — | — | 5 | 5 | 45 | Na₂O: 0.3 |
| G22 | 44.5 | — | — | — | 5 | 5 | 45 | Na₂O: 0.5 |
| G23 | 44.7 | — | — | — | 5 | 5 | 45 | K₂O: 0.3 |
| G24 | 44.5 | — | — | — | 5 | 5 | 45 | K₂O: 0.5 |
| G25 | 25 | — | — | — | 5 | 5 | 45 | PbO: 20 |
| G26 | 15 | — | — | — | 5 | 5 | 45 | PbO: 30 |
| G27 | — | — | — | 30 | 5 | 5 | 45 | PbO: 15 |

(unit: percent by weight)

3. Production of Ceramic Material Composition and Sintered Body

A selected one of ceramic compositions S1 to S10 and glass composition G1 to G18, 21, 23, and 25 to 27 were combined. That is, powders of a specific ceramic composition and a specific glass composition were weighed so as to achieve a sample composition. Powders of alumina and $CeO_2$ were also weighed. Then, the weighed powders were sufficiently mixed.

In Table 3, the contents of the ceramic composition, glass composition, and alumina are expressed in terms of percent by weight. The content of $CeO_2$ is expressed in terms of parts by weight with respect to 100 parts by weight of the total of the ceramic composition, glass composition, and alumina.

TABLE 3

| Sample | Ceramic composition Type | Ceramic composition Amount [wt %] | Alumina [wt %] | CeO₂ parts by weight | Glass composition Type | Glass composition Amount [wt %] |
|---|---|---|---|---|---|---|
| 1 | S1 | 34.0 | 18.0 | 0.3 | G1 | 48.0 |
| 2 | S2 | 34.0 | 18.0 | 0.3 | G1 | 48.0 |
| 3 | S3 | 34.0 | 18.0 | 0.3 | G1 | 48.0 |
| 4 | S4 | 34.0 | 18.0 | 0.3 | G1 | 48.0 |
| 5 | S5 | 34.0 | 18.0 | 0.3 | G1 | 48.0 |
| 6 | S6 | 34.0 | 18.0 | 0.3 | G1 | 48.0 |
| 7 | S7 | 34.0 | 18.0 | 0.3 | G1 | 48.0 |
| 8 | S8 | 34.0 | 18.0 | 0.3 | G1 | 48.0 |
| 9 | S9 | 34.0 | 18.0 | 0.3 | G1 | 48.0 |
| 10 | S10 | 34.0 | 18.0 | 0.3 | G1 | 48.0 |
| 11 | S1 | 34.0 | 18.0 | 0.3 | G2 | 48.0 |
| 12 | S1 | 34.0 | 18.0 | 0.3 | G3 | 48.0 |
| 13 | S1 | 34.0 | 18.0 | 0.3 | G4 | 48.0 |
| 14 | S1 | 34.0 | 18.0 | 0.3 | G5 | 48.0 |
| 15 | S1 | 34.0 | 18.0 | 0.3 | G6 | 48.0 |
| 16 | S1 | 34.0 | 18.0 | 0.3 | G7 | 48.0 |
| 17 | S1 | 34.0 | 18.0 | 0.3 | G8 | 48.0 |
| 18 | S1 | 34.0 | 18.0 | 0.3 | G9 | 48.0 |
| 19 | S1 | 34.0 | 18.0 | 0.3 | G10 | 48.0 |
| 20 | S1 | 34.0 | 18.0 | 0.3 | G11 | 48.0 |
| 21 | S1 | 34.0 | 18.0 | 0.3 | G12 | 48.0 |
| 22 | S1 | 34.0 | 18.0 | 0.3 | G13 | 48.0 |
| 23 | S1 | 34.0 | 18.0 | 0.3 | G14 | 48.0 |
| 24 | S1 | 34.0 | 18.0 | 0.3 | G15 | 48.0 |
| 25 | S1 | 34.0 | 18.0 | 0.3 | G16 | 48.0 |
| 26 | S1 | 34.0 | 18.0 | 0.3 | G17 | 48.0 |
| 27 | S1 | 34.0 | 18.0 | 0.3 | G18 | 48.0 |
| 28 | S1 | 34.0 | 18.0 | 0.3 | G21 | 48.0 |
| 29 | S1 | 34.0 | 18.0 | 0.3 | G23 | 48.0 |
| 30 | S1 | 34.0 | 18.0 | 0.3 | G25 | 48.0 |
| 31 | S1 | 34.0 | 18.0 | 0.3 | G26 | 48.0 |
| 32 | S1 | 34.0 | 18.0 | 0.3 | G27 | 48.0 |

Appropriate amounts of a binder, a plasticizer, and a solvent were added to the resulting mixed powder and the resulting mixture was kneaded to form a slurry.

The resulting slurry was formed into a sheet having a thickness of 50 μm by the doctor blade method. The resulting ceramic green sheet was cut into rectangular pieces having 30 mm×10 mm in planar dimensions. The resulting rectangular ceramic green sheets were laminated and press-bonded to form a laminate having a thickness of 0.5 mm.

The resulting laminates were fired at 870° C. for 1 hour to form sintered bodies of samples 1 to 32.

4. Evaluation

The resulting sintered bodies were each evaluated for dielectric constant, Q-value, temperature coefficient of capacitance, and reliability in PCT. Table 4 shows the results.

The dielectric constant and the Q-value were measured at 3 GHz by a resonance method. With respect to reliability in a pressure cooker test (PCT), the sample was placed for 100 hours at a temperature of 120° C., a pressure of 2 atm, and a humidity of 95% and then evaluated for breakdown strength. A sample in which dielectric breakdown did not occur is indicated by "Good" in Table 4.

In the "Remarks" column of Table 4, an unsuitable phenomenon observed in the experiment was simply described.

TABLE 4

| Sample | Dielectric constant (ε) | Qf [GHz] | Temperature coefficient (TCC) [ppm/° C.] | Reliability in PCT | Remarks |
|---|---|---|---|---|---|
| 1 | 15.5 | 3500 | 5 | Good | |
| 2 | 18.0 | 900 | −110 | Good | Low Q, high TCC |

TABLE 4-continued

| Sample | Dielectric constant (ε) | Qf [GHz] | Temperature coefficient (TCC) [ppm/° C.] | Reliability in PCT | Remarks |
|---|---|---|---|---|---|
| 3 | 11.5 | 1100 | −150 | Good | High TCC |
| 4 | 9.9 | 900 | 10 | Good | Low ε, low Q |
| 5 | 9.8 | 1200 | 50 | Good | Low ε |
| 6 | 15.8 | 2900 | −20 | Good | |
| 7 | 15.9 | 2400 | −25 | Good | |
| 8 | 14.0 | 2200 | 7 | Good | |
| 9 | 15.0 | 3400 | 10 | Good | |
| 10 | 15.3 | 3000 | 2 | Good | |
| 11 | — | — | — | — | Unsintered |
| 12 | 14.8 | 2900 | 12 | Good | |
| 13 | 15.9 | 3100 | 10 | Good | |
| 14 | 16.4 | 2500 | 12 | Poor | Dielectric breakdown |
| 15 | 15.3 | 3300 | 6 | Good | |
| 16 | 15.0 | 2500 | 8 | Good | |
| 17 | 14.8 | 900 | 15 | Good | Low Q |
| 18 | — | — | — | — | Unsintered |
| 19 | 14.9 | 2200 | 0 | Good | |
| 20 | 16.2 | 2900 | −5 | Good | |
| 21 | 16.3 | 2800 | −10 | Poor | Dielectric breakdown |
| 22 | 16.0 | 2300 | 20 | Poor | Dielectric breakdown |
| 23 | 15.7 | 2800 | 10 | Good | |
| 24 | 15.0 | 2300 | 2 | Good | |
| 25 | 15.6 | 2100 | 7 | Good | |
| 26 | 15.8 | 1800 | 10 | Good | |
| 27 | 16.0 | 2400 | 5 | Good | |
| 28 | 16.1 | 2000 | 12 | Good | |
| 29 | 16.2 | 1800 | 9 | Good | |
| 30 | 9.8 | 1700 | 60 | Good | Low ε |
| 31 | 9.7 | 1400 | 70 | Good | Low ε |
| 32 | 8.9 | 1200 | 90 | Good | Low ε |

As is apparent from Table 3, samples 1 to 32 have the same contents of the ceramic composition, alumina, $CeO_2$, and the glass composition. Only the type of ceramic composition or glass composition was different. Specifically, ceramic composition S1 was used in samples 1 and 11 to 32. In samples 2 to 10, ceramic compositions other than ceramic composition S1 were used. With respect to the type of glass composition, glass composition G1 was used in samples 1 to 10. In samples 11 to 32, glass compositions other than glass composition G1 were used.

Among samples 1 to 32, as shown in Table 4, preferable results were obtained in samples 1, 6 to 10, 12, 13, 15, 16, 19, 20 and 23 to 29.

These samples meet the requirements that the content of the ceramic composition is about 10 to 45 percent by weight, the content of alumina is about 5 to 40 percent by weight, the content of the glass composition is about 40 to 65 percent by weight, and the total content of the ceramic composition and alumina is about 35 percent by weight or more. Furthermore, these samples satisfy the requirement that the content of $CeO_2$ is about 3 parts by weight or less.

With respect to the ceramic composition, one of the ceramic compositions S1 and S6 to S10 shown in Table 1 was used. These ceramic compositions meet the requirements that in $xBaO$-$yTiO_2$-$zReO_{3/2}$, $8 \leq x \leq 18$, $52.5 \leq y \leq 65$, and $20 \leq z \leq 40$, and $x+y+z=100$.

Furthermore, with respect to the glass composition, one of the glass compositions G1, G3, G4, G6, G7, G10, G11, G14 to G18, G21, and G23 shown in Table 2 was used. These glass compositions meet the requirements that the content of $B_2O_3$ is about 4 to 17.5 percent by weight, the content of $SiO_2$ is about 28 to 50 percent by weight, the content of $Al_2O_3$ is 0 to about 20 percent by weight, and the content of at least one compound selected from CaO, MgO, SrO and BaO is about 36 to 50 percent by weight.

In contrast, as shown in Table 4, sample 2 exhibited a large absolute value of the temperature coefficient and a small Qf. This is due to use of ceramic composition S2 as shown in Table 3. As shown in Table 1, ceramic composition S2 contains 25 mol % of BaO, which is greater than about 18 mol %.

As shown in Table 4, sample 3 exhibited a large absolute value of the temperature coefficient. This is due to use of ceramic composition S3 as shown in Table 3. Ceramic composition S3, as shown in Table 1, contains 5 mol % of BaO, which is smaller than about 8 mol %. In addition, the ceramic composition S3 contains 75 mol % of $TiO_2$, which is greater than about 65 mol %.

Table 4 shows that sample 4 exhibited a low dielectric constant and a low Qf. This is due to use of ceramic composition S4 as shown in Table 3. As shown in Table 1, ceramic composition S4 contains 2 mol % of BaO, which is smaller than about 8 mol %.

As shown in Table 4, sample 5 exhibited a low dielectric constant. This is due to use of ceramic composition S5 as shown in Table 3. As shown in Table 1, ceramic composition S5 contains 50 mol % of $TiO_2$, which is smaller than about 52.5 mol %.

Sample 11 was not sintered at a firing temperature of 870° C. as shown in Table 4. This is due to use of glass composition G2 as shown in Table 3. Glass composition G2, as shown in Table 2, contains 30 percent by weight of CaO, which is smaller than about 36 percent by weight. Furthermore, glass composition G2 contains 60 percent by weight of $SiO_2$, which is greater than about 50 percent by weight.

As shown in Table 4, dielectric breakdown occurred with respect to the reliability in the PCT in sample 14. This is due to use of glass composition G5 as shown in Table 3. As shown in Table 2, glass composition G5 contains 60 percent by weight of CaO, which is greater than about 50 percent by weight.

Sample 17 exhibited a low Qf, as shown in Table 4. This is due to use of glass composition G8 as shown in Table 3. As shown in Table 2, glass composition G8 contains 35 percent by weight of CaO, which is smaller than about 36 percent by weight. Furthermore, glass composition G8 contains 30 percent by weight of $Al_2O_3$, which is greater than about 20 percent by weight.

As shown in Table 4, sample 18 was not sintered at a firing temperature of 870° C. This is due to use of glass composition G9 as shown in Table 3. As shown in Table 2, glass composition G9 contains 2 percent by weight of $B_2O_3$, which is smaller than about 4 percent by weight.

In sample 21, with respect to the reliability in the PCT, dielectric breakdown occurred, as shown in Table 4. This is due to use of glass composition G12 as shown in Table 3. As shown in Table 2, glass composition G12 contains 20 percent by weight of $B_2O_3$, which is greater than about 17.5 percent by weight.

Table 4 shows that with respect to the reliability in the PCT, dielectric breakdown occurred in sample 22. This is due to use of glass composition G13 as shown in Table 3. As shown in Table 2, glass composition G13 contains 25 percent by weight of $SiO_2$, which is smaller than about 28 percent by weight.

As shown in Table 4, each of samples 30 to 32 exhibited a low dielectric constant. This is due to use of glass compositions G25 to G27 as shown in Table 3. As shown in Table 2, each of glass compositions G25 to G27 do not contain an alkali metal oxide, such as $Li_2O$, but cannot increase the dielectric constant as described above. On the other hand, as shown in Table 2, glass compositions G25 to G27 each contain PbO for improving sinterability. The reason for the reduced dielectric constant is believed to be that PbO reacts with the ceramic composition as a filler and/or alumina. Thus, with respect to the glass composition, it is necessary that not only the alkali metal is simply removed but also a glass composition having good compatible with the filler should be selected.

EXPERIMENTAL EXAMPLE 2

In Experimental Example 2, a ceramic material composition was produced with ceramic composition S1 shown in Table 1 and glass composition G1 shown in Table 2, as shown in Table 5, and then a sintered body of the ceramic material composition was produced in the same way as in Experimental Example 1, except that the contents of the ceramic composition, alumina, and the glass composition were changed.

TABLE 5

| Sample | Ceramic composition Type | Amount [wt %] | Alumina [wt %] | $CeO_2$ parts by weight | Glass composition Type | Amount [wt %] |
|---|---|---|---|---|---|---|
| 33 | S1 | 5.0  | 40.0 | 0.3 | G1 | 55.0 |
| 34 | S1 | 10.0 | 40.0 | 0.3 | G1 | 50.0 |
| 35 | S1 | 45.0 | 10.0 | 0.3 | G1 | 45.0 |
| 36 | S1 | 55.0 | 0    | 0.3 | G1 | 45.0 |
| 37 | S1 | 45.0 | 5.0  | 0.3 | G1 | 50.0 |
| 38 | S1 | 42.0 | 10.0 | 0.3 | G1 | 48.0 |
| 39 | S1 | 12.0 | 40.0 | 0.3 | G1 | 48.0 |
| 40 | S1 | 10.0 | 50.0 | 0.3 | G1 | 40.0 |
| 41 | S1 | 45.0 | 25.0 | 0.3 | G1 | 30.0 |
| 42 | S1 | 40.0 | 20.0 | 0.3 | G1 | 40.0 |
| 43 | S1 | 23.0 | 12.0 | 0.3 | G1 | 65.0 |
| 44 | S1 | 20.0 | 10.0 | 0.3 | G1 | 70.0 |

Next, each sample shown in Table 5 was evaluated for dielectric constant, Q-value, the temperature coefficient of capacitance, and reliability in a PCT in the same way as in Experimental Example 1. Furthermore, in Experimental Example 2, an evaluation of insulation resistance was also made. With respect to the insulation resistance, after a DC voltage of 50 V was applied to the sample at 25° C. for 30 seconds, the insulation resistance was measured and expressed as the logarithm of the result (log IR). Table 6 shows the results.

TABLE 6

| Sample | Dielectric constant ($\epsilon$) | Qf [GHz] | Temperature coefficient (TCC) [ppm/° C.] | Reliability in PCT | Insulation resistance (log IR) [Ω] | Remarks |
|---|---|---|---|---|---|---|
| 33 | 8.7  | 1800 | 100  | Good | 12.1 | Low $\epsilon$, high TCC |
| 34 | 10.9 | 2200 | 77   | Good | 12.4 | |
| 35 | 21.5 | 3300 | −95  | Good | 12.6 | |
| 36 | 24.0 | 2800 | −180 | Good | 5    | High TCC, insulation degradation occurred |
| 37 | 20.5 | 3100 | −90  | Good | —    | |
| 38 | 19.5 | 3200 | −95  | Good | —    | |
| 39 | 11.5 | 2400 | 75   | Good | —    | |
| 40 | 9.8  | 2000 | 100  | Good | —    | Low $\epsilon$, high TCC |
| 41 | —    | —    | —    | —    | —    | Unsintered |
| 42 | 16.5 | 3300 | −20  | Good | —    | |
| 43 | 12.0 | 3000 | 35   | Good | —    | |
| 44 | 9.8  | 2600 | 80   | Good | —    | Low $\epsilon$ |

Among samples 33 to 44, preferable results were obtained in samples 34, 35, 37, 38, 39, 42 and 43, as shown in Table 6.

These samples meet the requirements that the content of the ceramic composition is about 10 to 45 percent by weight, the content of alumina is about 5 to 40 percent by weight, the content of the glass composition is about 40 to 65 percent by weight, and the total content of the ceramic composition and alumina is about 35 percent by weight or more. Furthermore, these samples meet the requirement that the content of $CeO_2$ is about 3 parts by weight or less.

As shown in Table 6, sample 33 exhibited a low dielectric constant and a large absolute value of the temperature coefficient. This is because, as shown in Table 5, the content of the ceramic composition S1 is 5.0 percent by weight, which is less than about 10 percent by weight.

As shown in Table 6, sample 36 exhibited a large absolute value of the temperature coefficient. In addition, the degradation of the insulation resistance occurred. This is because, as shown in Table 5, the content of the ceramic composition S1 is 55.0 percent by weight, which is more than about 45 percent by weight. Furthermore, this is because the content of alumina is 0 percent by weight, which is less than about 5 percent by weight.

Table 6 shows that sample 36 exhibited a low dielectric constant and a large absolute value of the temperature coefficient. This is because, as shown in Table 5, the content of the alumina is 50.0 percent by weight, which is more than about 40 percent by weight.

As shown in Table 6, sample 41 was not sintered at a firing temperature of 870° C. This is because, as shown in Table 5, the content of the glass composition G1 is 30.0 percent by weight, which is less than about 40 percent by weight.

Sample 44 exhibited a low dielectric constant, as shown in Table 6. This is because, as shown in Table 5, the total content of the ceramic composition S1 and the alumina is 30.0 percent by weight, which is less than about 35 percent by weight, and the content of the glass composition G1 is 70.0 percent by weight, which is more than about 65 percent by weight.

EXPERIMENTAL EXAMPLE 3

In Experimental Example 3, as shown in Table 7, a ceramic material composition was produced with ceramic composition S1 shown in Table 1 and glass composition G1 shown in Table 2, and then a sintered body of the ceramic material composition was produced in the same way as in Experimental Example 1, except that the contents of the ceramic composition S1 and $CeO_2$ were changed and, in specific samples, $CaTiO_3$ was added.

TABLE 7

| Sample | Ceramic composition Type | Amount [wt %] | Alumina [wt %] | $CeO_2$ parts by weight | $CaTiO_3$ [wt %] | Glass composition Type | Amount [wt %] |
|---|---|---|---|---|---|---|---|
| 45 | S1 | 34.0 | 18.0 | 0 | 0 | G1 | 48.0 |
| 46 | S1 | 34.0 | 18.0 | 3.0 | 0 | G1 | 48.0 |
| 47 | S1 | 34.0 | 18.0 | 5.0 | 0 | G1 | 48.0 |
| 48 | S1 | 29.0 | 18.0 | 0.3 | 5.0 | G1 | 48.0 |
| 49 | S1 | 14.0 | 18.0 | 0.3 | 20.0 | G1 | 48.0 |
| 50 | S1 | 4.0 | 18.0 | 0.3 | 30.0 | G1 | 48.0 |

Next, each sample shown in Table 7 was evaluated for dielectric constant, Q-value, temperature coefficient of capacitance, and reliability in a PCT in the same way as in Experimental Example 1. Table 8 shows the results.

TABLE 8

| Sample | Dielectric constant ($\epsilon$) | Qf [GHz] | Temperature coefficient (TCC) [ppm/°C.] | Reliability in PCT | Remarks |
|---|---|---|---|---|---|
| 45 | 15.4 | 2800 | 5 | Good | |
| 46 | 15.3 | 1800 | 4 | Good | |
| 47 | 15.2 | 800 | 0 | Good | Low Q |
| 48 | 16.1 | 3200 | −20 | Good | |
| 49 | 17.2 | 2100 | −100 | Good | High TCC |
| 50 | 18.0 | 2300 | −190 | Good | High TCC |

Among samples 45 to 50, preferable results were obtained in samples 45, 46, and 48.

These samples meet the requirements that the content of the ceramic composition is about 10 to 45 percent by weight, the content of alumina is about 5 to 40 percent by weight, the content of the glass composition is about 40 to 65 percent by weight, and the total content of the ceramic composition and alumina is about 35 percent by weight or more. Furthermore, these samples meet the requirement that the content of $CeO_2$ is about 3 parts by weight or less, and the content of $CaTiO_3$ is about 20 percent by weight or less.

In contrast, Table 8 shows that sample 47 exhibited a low Q-value. This is because, as shown in Table 7, the content of $CeO_2$ is 5.0 parts by weight, which is more than about 3 parts by weight.

As shown in Table 8, sample 49 exhibited a large absolute value of the temperature coefficient. This is because, as shown in Table 7, the total content of ceramic composition S1 and alumina is 32.0 percent by weight, which is less than about 35 percent by weight.

Table 8 shows that sample 50 exhibited a large absolute value of the temperature coefficient. This is because, as shown in Table 7, the total content of ceramic composition S1 and alumina is 22.0 percent by weight, which is less than about 35 percent by weight, and the content of $CaTiO_3$ is 30.0 percent by weight, which is more than about 20 percent by weight.

EXPERIMENTAL EXAMPLE 4

In Experimental Example 4, as shown in Table 9, samples 1 and 27 produced in Experimental Example 1 and sample 34 produced in Experimental Example 2 were used. Furthermore, ceramic material compositions and their sintered bodies for forming samples 51 and 52 containing glass compositions G19 and G20, respectively, shown in Table 2 were produced. Moreover, ceramic material compositions and sintered bodies for forming samples 53, 54, 55, and 56 containing glass compositions G19, G20, G22, and G24, respectively, shown in Table 2 were produced.

TABLE 9

| Sample | Ceramic composition Type | Amount [wt %] | Alumina [wt %] | $CeO_2$ part by weight | Glass composition Type | Amount [wt %] |
|---|---|---|---|---|---|---|
| 1 | S1 | 34.0 | 18.0 | 0.3 | G1 | 48.0 |
| 27 | S1 | 34.0 | 18.0 | 0.3 | G18 | 48.0 |
| 51 | S1 | 34.0 | 18.0 | 0.3 | G19 | 48.0 |
| 52 | S1 | 34.0 | 18.0 | 0.3 | G20 | 48.0 |
| 34 | S1 | 10.0 | 40.0 | 0.3 | G1 | 50.0 |
| 53 | S1 | 10.0 | 40.0 | 0.3 | G19 | 50.0 |
| 54 | S1 | 10.0 | 40.0 | 0.3 | G20 | 50.0 |
| 55 | S1 | 10.0 | 40.0 | 0.3 | G22 | 50.0 |
| 56 | S1 | 10.0 | 40.0 | 0.3 | G24 | 50.0 |

As shown in Table 9, among samples 1, 27, 51 and 52, contents of the ceramic composition and alumina are the same. Similarly, among samples 34, 53, 54, 55 and 56, contents of the ceramic composition and alumina are the same. Between the group of samples 1, 27, 51 and 52 and the group of samples 34, 53, 54, 55 and 56, contents of the ceramic composition and alumina are different.

Samples 1, 27, 51, 52, 34, 53, 54, 55 and 56 shown in Table 9 were each evaluated for dielectric constant, Q-value, temperature coefficient of capacitance, and reliability in PCT in the same way as in Experimental Example 1. In addition, an evaluation of resistance characteristics was also made.

The evaluation on resistance characteristics is made to evaluate for the influence of the reaction of a resistor with a ceramic material in firing on the resistor. That is, a resistor paste containing $RuO_2$ as a main component and lead silicate glass as an inorganic component was prepared. When a resistor film having a size of 0.5 mm×0.5 mm and a thickness of 20 μm is formed by using the resistor paste, the resistor film shows a resistance of 100Ω. A resistor paste film was formed in such a manner that a resistor film having a size of 0.5 mm×0.5 mm and a thickness of 20 μm is formed, by using the resistor paste along the interface between ceramic green sheets constituting a laminate produced as described above. Then, the laminate containing the resistor paste film was fired under the above-described conditions. After firing, the resistance of the sintered resistor was measured. The results are shown in the "Resistance characteristics" column. With respect to the resistance characteristics, when the resistance was 20Ω or less, the "Remarks" column represents "Poor resistance characteristics".

TABLE 10

| Sample | Resistance characteristics [Ω] | Dielectric constant (ε) | Qf [GHz] | Temperature coefficient (TCC) [ppm/° C.] | Reliability in PCT | Remarks |
|---|---|---|---|---|---|---|
| 1  | 168 | 15.5 | 3500 | 5  | Good |  |
| 27 | 61  | 16.0 | 2400 | 5  | Good |  |
| 51 | 20  | 16.1 | 2300 | 10 | Good | Poor resistance characteristics |
| 52 | 13  | 16.1 | 2100 | 15 | Good | Poor resistance characteristics |
| 34 | 150 | 10.9 | 2200 | 77 | Good |  |
| 53 | 18  | 11.2 | 2000 | 75 | Good | Poor resistance characteristics |
| 54 | 11  | 10.8 | 2100 | 80 | Good | Poor resistance characteristics |
| 55 | 12  | 10.6 | 2100 | 75 | Good | Poor resistance characteristics |
| 56 | 10  | 11.0 | 2000 | 68 | Good | Poor resistance characteristics |

Table 10 shows that in samples 51, 52, 53, 54, 55 and 56, the resistance characteristics were significantly degraded. This is due to use of glass compositions G19, G20, G22 or G24 as shown in Table 9. As shown in Table 2, glass composition G19 contains 0.5 percent by weight of $Li_2O$. Glass composition G20 contains 1 percent by weight of $Li_2O$. Glass composition G22 contains 0.5 percent by weight of $Na_2O$. Glass composition G24 contains 0.5 percent by weight of $K_2O$. When the content of the alkali metal oxide, such as $Li_2O$, $Na_2O$ or $K_2O$, is about 0.5 percent by weight or more, it is believed that the alkali metal reacts with lead contained in the resistor paste to degrade the resistance characteristics despite the content of the ceramic composition.

EXPERIMENTAL EXAMPLE 5

In Experimental Example 5, as shown in Table 11, samples 1, 12 and 13 produced in Experimental Example 1 were used. In addition, ceramic compositions and their sintered bodies for forming samples 57 to 65 were produced, samples 57 to 65 not containing the $BaO$—$TiO_2$—$ReO_{3/2}$ ceramic composition shown in Table 1 but containing any one of alumina, $CeO_2$, and glass compositions G1, G15, G16, G17 and G20 shown in Table 2.

With respect to glass compositions G1, G15, G16, G17 and G20 described above, glass composition G1 is a $CaO$—$Al_2O_3$—$B_2O_3$—$SiO_2$ glass composition but each of glass compositions G15, G16, G17 and G20 is not a $CaO$—$Al_2O_3$—$B_2O_3$—$SiO_2$ glass composition.

TABLE 11

| Sample | Ceramic composition Type | Ceramic composition Amount [wt %] | Alumina [wt %] | $CeO_2$ parts by weight | Glass composition Type | Glass composition Amount [wt %] |
|---|---|---|---|---|---|---|
| 1  | S1 | 34.0 | 18.0 | 0.3 | G1  | 48.0 |
| 12 | S1 | 34.0 | 18.0 | 0.3 | G3  | 48.0 |
| 13 | S1 | 34.0 | 18.0 | 0.3 | G4  | 48.0 |
| 57 | —  | —    | 30.0 | 0.3 | G1  | 70.0 |
| 58 | —  | —    | 35.0 | 0.3 | G1  | 65.0 |
| 59 | —  | —    | 50.0 | 0.3 | G1  | 50.0 |
| 60 | —  | —    | 68.0 | 0.3 | G1  | 32.0 |
| 61 | —  | —    | 75.0 | 0.3 | G1  | 25.0 |
| 62 | —  | —    | 50.0 | 0.3 | G15 | 50.0 |
| 63 | —  | —    | 50.0 | 0.3 | G16 | 50.0 |
| 64 | —  | —    | 50.0 | 0.3 | G17 | 50.0 |
| 65 | —  | —    | 50.0 | 0.3 | G20 | 50.0 |

Next, each of samples 1, 12, 13 and 57 to 65 shown in Table 11 was evaluated for, as shown in FIG. 12, dielectric constant, Q-value, temperature coefficient of capacitance, and reliability in a PCT in the same way as in Experimental Example 1. Furthermore, an evaluation of a thermal expansion coefficient was made.

TABLE 12

| Sample | Dielectric constant (ε) | Qf [GHz] | Temperature coefficient (TCC) [ppm/° C.] | Reliability in PCT | thermal expansion coefficient [α] [ppm/° C.] | Remarks |
|---|---|---|---|---|---|---|
| 1  | 15.5 | 3500 | 5   | Good | 7.7 |  |
| 12 | 14.8 | 2900 | 12  | Good | 8.1 |  |
| 13 | 15.9 | 3100 | 10  | Good | 7.9 |  |
| 57 | 9.2  | 1500 | 120 | Poor | 7   | Dielectric breakdown |
| 58 | 9.1  | 1600 | 120 | Good | 7.6 |  |
| 59 | 8.8  | 1800 | 115 | Good | 7.8 |  |
| 60 | 8.6  | 2000 | 100 | Good | 8.1 |  |
| 61 | 8.4  | 2000 | 90  | Good | 9.2 | High α |
| 62 | 7.3  | 1800 | 116 | Good | 6.8 |  |
| 63 | 9.4  | 1700 | 140 | Good | 8.9 |  |

TABLE 12-continued

| Sample | Dielectric constant ($\epsilon$) | Qf [GHz] | Temperature coefficient (TCC) [ppm/° C.] | Reliability in PCT | thermal expansion coefficient [$\alpha$] [ppm/° C.] | Remarks |
|---|---|---|---|---|---|---|
| 64 | 9.8 | 1600 | 150 | Good | 9.9 | High $\alpha$ |
| 65 | 16.0 | 3000 | 5 | Good | 7.7 | |

In the "Remarks" column of Table 12, an unsuitable phenomenon observed in the experiment was simply described. The wording "Dielectric breakdown" represents the occurrence of the dielectric breakdown with respect to the reliability in the PCT as in the case shown in Table 4. Furthermore, the wording "High $\alpha$" represents that the specified sample had a large difference in thermal expansion coefficient ($\alpha$) as compared with sample 1, 12 or 13.

As shown in Table 12, dielectric breakdown occurred with respect to the reliability in the PCT in sample 57. This is because, as shown in Table 11, the content of alumina is 30.0 percent by weight, which is less than about 35 percent by weight, and the content of the glass composition G1 is 70.0 percent by weight, which is more than about 65 percent by weight.

As shown in Table 12, the thermal expansion coefficient ($\alpha$) was increased in sample 61. This is because, as shown in Table 11, the content of alumina is 75.0 percent by weight, which is more than about 74 percent by weight, and the content of glass composition G1 is 25.0 percent by weight, which is less than about 26 percent by weight.

Table 12 shows that in sample 64, the thermal expansion coefficient ($\alpha$) was also increased. The reason for the increase is believed that glass composition G17 was used.

Next, the evaluation of a ceramic substrate having a composite structure combining a high-dielectric-constant material that is one selected from samples 1, 12 and 13 shown in Table 11 with a low-dielectric-constant material that is one selected from samples 57 to 65 was made.

That is, slurries containing respective samples 1, 12, 13 and 57 to 65 shown in Table 11 were formed. The resulting slurries were formed into ceramic green sheets each having a thickness of 50 μm by a doctor blade method. Each of the resulting ceramic green sheets was cut into rectangular ceramic green sheets each having a size of 30 mm×10 mm in planar dimensions.

According to the combination of the samples shown in the "Combination for composite structure" column, the ceramic green sheets of the samples are alternately laminated, press-bonded, and fired at 870° C. for 1 hour to form a sintered ceramic substrate having the composite structure.

The resulting ceramic substrate according to each sample combination was evaluated for the presence or absence of the occurrence of delamination. The results were shown in the "Delamination" column.

Furthermore, after removing the ceramic layers of samples 57 to 65 functioning as low-dielectric-constant layers, the dielectric constant of each of the remaining ceramic layers of samples 1, 12 and 13 was measured at 3 GHz by a resonance method. The resulting dielectric constants were compared with the dielectric constants of samples 1, 12 and 13 shown in Table 12. In other words, the resulting dielectric constants were compared with the dielectric constants of the sintered bodies obtained by firing alone to calculate how much the dielectric constant is reduced. The results are shown in the "Rate of reduction in dielectric constant" column in Table 13.

TABLE 13

| Combination for composite structure | | Rate of reduction in dielectric constant | |
|---|---|---|---|
| Sample | Sample | [%] | Delamination |
| 1 | 59 | <5 | None |
| 12 | 59 | <5 | None |
| 13 | 59 | <5 | None |
| 1 | 57 | <5 | None |
| 1 | 58 | <5 | None |
| 1 | 60 | <5 | None |
| 1 | 61 | <5 | Occurred |
| 1 | 62 | 15 | None |
| 1 | 63 | 21 | None |
| 1 | 64 | 25 | Occurred |
| 1 | 65 | 30 | None |

As is apparent from Table 13, the dielectric constants were relatively significantly reduced in the composite structure obtained by combining sample 1 with any one of samples 62 to 65. It is believed that this results from the fact that in samples 62 to 65, the glass compositions G15, G16, G17 and G20, which are glass compositions other than a CaO—AlO$_2$O$_3$—B$_2$O$_3$—SiO$_2$ glass composition, was used as shown in Table 11, and an interdiffusion reaction occurs between the high-dielectric-constant layer and the low-dielectric-constant layer to reduce the dielectric constant in the vicinity of the interface.

In the composite structure obtained by combining sample 1 with sample 61 and the composite structure obtained by combining sample 1 with sample 64, as shown in Table 12, the difference ($\alpha$) in thermal expansion coefficient was large; hence, delamination occurred as shown in Table 13.

The invention claimed is:

1. A ceramic material composition comprising:
   (a) about 10 to 45 percent by weight of a BaO—TiO$_2$—ReO$_{3/2}$ ceramic composition, the ceramic composition being represented by xBaO-yTiO$_2$-zReO$_{3/2}$ wherein x, y, and z each represent mole percent and $8 \leq x \leq 18$, $52.5 \leq y \leq 65$, and $20 \leq z \leq 40$, and x+y+z=100; and Re represents a rare-earth element;
   (b) about 5 to 40 percent by weight of alumina; and
   (c) about 40 to 65 percent by weight of a borosilicate glass composition containing about 4 to 17.5 percent by weight of B$_2$O$_3$, about 28 to 50 percent by weight of SiO$_2$, 0 to about 20 percent by weight of Al$_2$O$_3$, and about 36 to 50 percent by weight of MO,
   wherein said alumina does not encompass any Al$_2$O$_3$ which may be present in said borosilicate glass composition,
   wherein MO represents at least one compound selected from CaO, MgO, SrO and BaO,
   and wherein the combined content of the BaO—TiO$_2$—ReO$_{3/2}$ ceramic composition of and the alumina is at least about 35 percent by weight whereby the ceramic composition has a relatively high dielectric constant at least 10 and has a resistance to insulation degradation signified by having an IR of greater than 5.

2. The ceramic material composition according to claim 1, further comprising about 20 percent by weight or less of $CaTiO_3$.

3. The ceramic material composition according to claim 1, wherein the borosilicate glass composition further contains less than about 0.5 percent by weight of at least one compound selected from $Li_2O$, $Na_2O$ and $K_2O$.

4. The ceramic material composition according to claim 1, further comprising about 3 parts by weight or less of $CeO_2$ with respect to 100 parts by weight of the total of the $BaO$—$TiO_2$—$ReO_{3/2}$ ceramic composition, alumina, and the borosilicate glass composition.

5. A ceramic substrate comprising a ceramic layer composed of a sintered body of the ceramic material composition according to claim 1.

6. The ceramic substrate according to claim 5, wherein the ceramic material composition is in the form of a plurality of laminated layers.

7. The ceramic substrate according to claim 6, further comprising a conductor comprising Ag or Cu.

8. The ceramic substrate according to claim 6, further comprising a resistor.

9. The ceramic substrate according to claim 5, further comprising at least one second ceramic layer having a dielectric constant of 10 or less.

10. The ceramic substrate according to claim 9, wherein the second ceramic layer comprises a sintered ceramic body containing about 26 to 65 percent by weight of $CaO$—$Al_2O_3$—$B_2O_3$—$SiO_2$ glass composition and about 35 to 74 percent by weight of alumina.

11. The ceramic substrate according to claim 5, further comprising about 20 percent by weight or less of $CaTiO_3$ and about 3 parts by weight or less of $CeO_2$ with respect to 100 parts by weight of the total of the $BaO$—$TiO_2$—$ReO_{3/2}$ ceramic composition, alumina, and the borosilicate glass composition, and wherein the borosilicate glass composition further contains less than about 0.5 percent by weight of at least one compound selected from $Li_2O$, $Na_2O$ and $K_2O$.

12. The ceramic substrate according to claim 11, wherein the ceramic material composition is in the form of a plurality of laminated layers.

13. The ceramic substrate according to claim 12, further comprising a conductor comprising Ag or Cu.

14. The ceramic substrate according to claim 12, further comprising a resistor.

15. The ceramic substrate according to claim 11, further comprising at least one second ceramic layer having a dielectric constant of 10 or less.

16. The ceramic substrate according to claim 15, wherein the second ceramic layer comprises a sintered ceramic body containing about 26 to 65 percent by weight of $CaO$—$Al_2O_3$—$B_2O_3$—$SiO_2$ glass composition and about 35 to 74 percent by weight of alumina.

\* \* \* \* \*